UNITED STATES PATENT OFFICE.

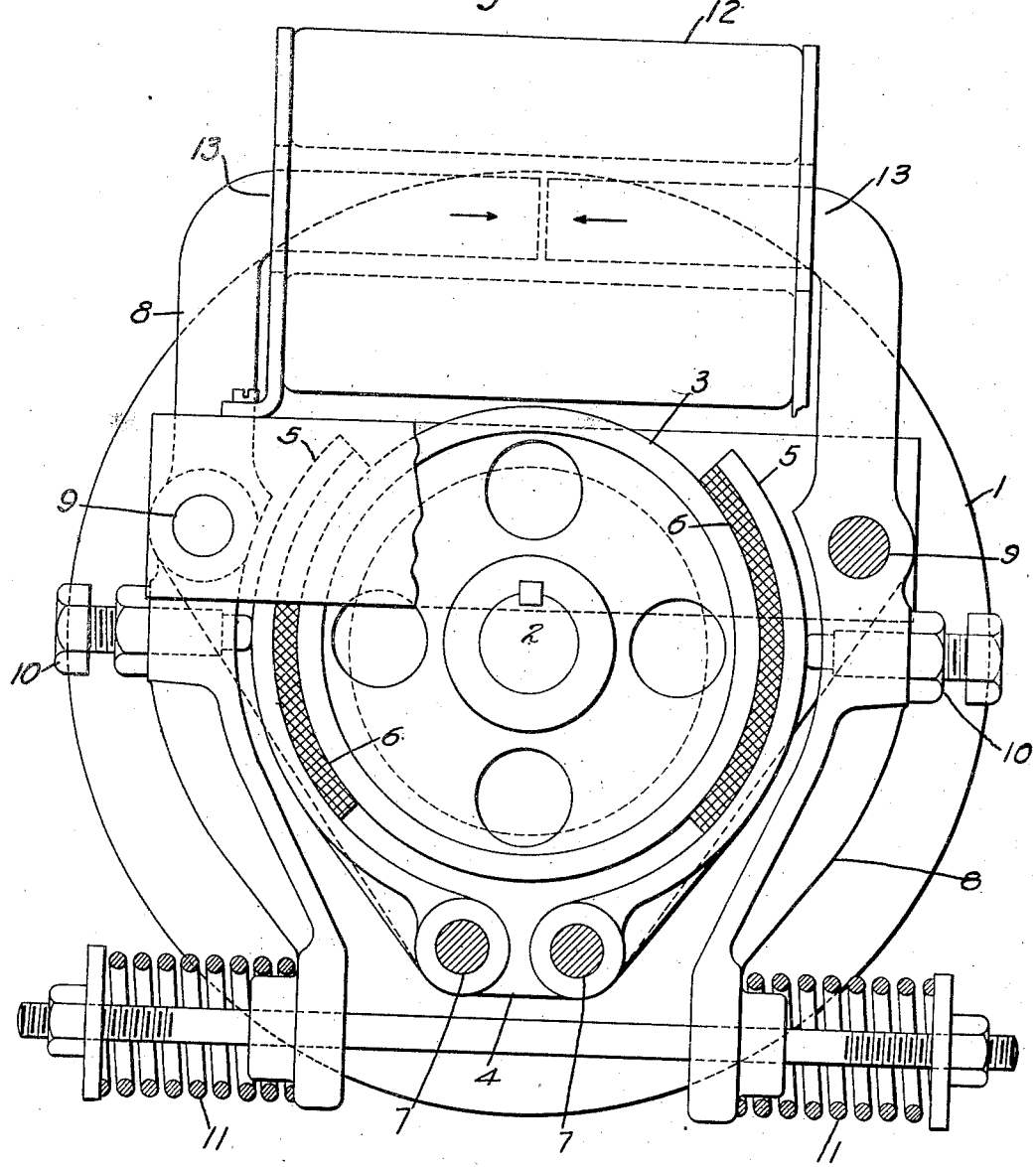

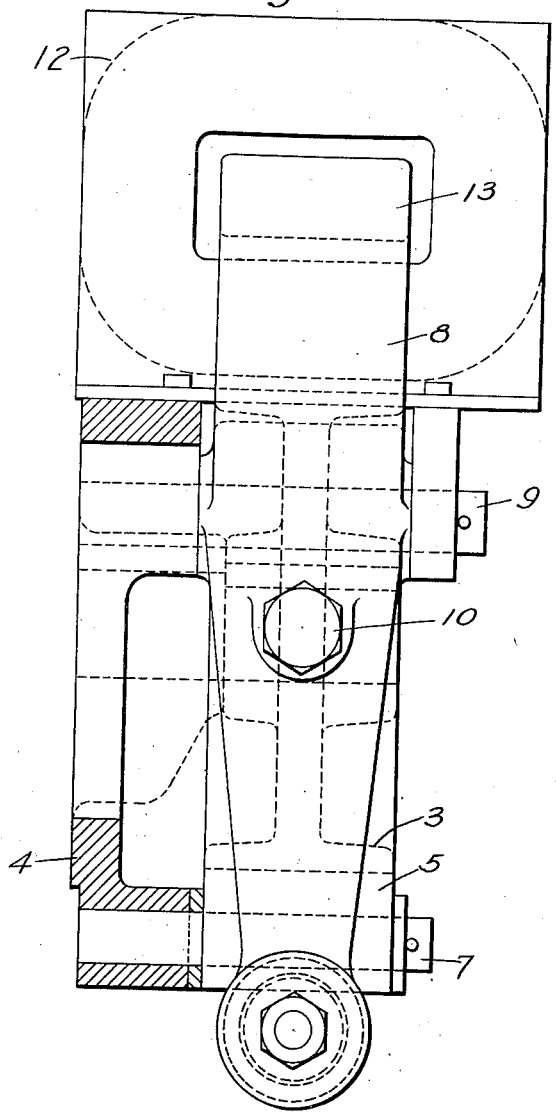

MAX E. GYSEL, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTROMAGNETIC BRAKE.

1,368,336.

Specification of Letters Patent.  Patented Feb. 15, 1921.

Application filed June 13, 1917. Serial No. 174,458.

*To all whom it may concern:*

Be it known that I, MAX E. GYSEL, a citizen of the Republic of Switzerland, and a resident of Wilkinsburg, in the county of Allegheny and State of Pennsylvania, have invented a new and useful Improvement in Electromagnetic Brakes, of which the following is a specification.

My invention relates to electromagnetic brakes, and it has for its object to provide a simple and efficient arrangement whereby the relative positions of the parts may be adjusted to compensate for wear of the brake shoes.

In the construction of brakes of the same general character as that of the mechanisms covered by the present application, it is customary to mount the brake shoes upon the pivotally-mounted levers that are controlled by electromagnets or other suitable power devices. It is necessary to provide some means for adjusting the normal positions of the levers in order that the air gaps of the electromagnets may be adjusted to compensate for changes incident to the wear of the brake shoes. This construction may, for example, take the form of means for adjusting the positions of the pivotal supports of the brake levers relatively to the brake wheel and to each other.

I provide an arrangement in which the brake shoes are pivotally supported independently of the brake levers. The brake shoes are disengaged from the brake wheel by the force of gravity when the brake levers are released by the electromagnets. The brake levers are provided with adjustable members for engaging the brake shoes. The brake levers and the brake shoes are, however, movable independently of each other. It is only necessary to adjust the engaging members of the brake levers in order to secure a corresponding adjustment of the lengths of the air gaps of the electromagnets.

In the accompanying drawings, Figure 1 is an end view, partially in elevation and partially in section, of an electromagnetic brake constructed in accordance with my invention. Fig. 2 is a side view, similar to Fig. 1, of the brake mechanism.

An electric motor 1, the outline of which is shown in Fig. 1, has a shaft 2 upon which is mounted a brake wheel 3. A frame member 4, which may be secured to the motor frame in any suitable manner, supports the brake structure.

Two brake shoes 5, which are lined with suitable friction material indicated at 6, are pivotally supported upon pins 7. The pivotal supports for the brake shoes 5 are located at such points that the force of gravity tends to actuate them from the brake wheel 3. Each of the brake shoes 5 is controlled by a lever 8 having a pivotal support 9. Each of the levers 8 is provided with an adjustable pin or bolt 10 for engaging the corresponding brake shoe 5.

Normally, the levers 8 are retained by springs 11 in such position as to effect the engagement of the brake shoes 5 and the wheel 3. The releasing means for the brake comprises an electromagnet having a coil 12 and core members 13 that may, for example, constitute integral parts of the levers 8.

Normally, the various parts occupy their respective illustrated positions, with the brake shoes in engagement with the brake wheel 3. When it is desired to operate the motor or other machine in connection with which the brake is employed, the circuit of the coil 12 is completed by any suitable means (not shown) and the core members 13 are drawn toward each other to actuate the levers 8 about their respective points of pivotal support. The brake shoes 5 are accordingly permitted to fall away from the brake wheel 3 by force of gravity.

When the circuit of the coil 12 is opened, the latter is deënergized and the springs 11, which were placed under compression, again effect engagement of the brake shoes with the coacting brake wheel in order to bring the mechanism to rest and to prevent movement of the latter except at desired times.

In case the brake linings 6 become worn during the normal operation of the brake, the brake shoes 5 and the levers 8 occupy such positions that the air gap between the ends of the core members 13 is materially increased. The effective pull of the electromagnet is decreased to a corresponding degree. In order to compensate for the wear of the brake linings and to maintain the various parts in their proper relations, it is only necessary to adjust the members 10 with an ordinary wrench. This operation may be performed without the removal of any of the brake parts or without in any way interfering with the operation of the brake. The above and other advantages will be apparent to those skilled in the art to which my invention appertains.

I claim as my invention:

1. In a brake, the combination with a brake wheel, a pair of pivotally supported brake shoes and a pair of pivotally mounted levers, said levers being mounted on opposite sides of said brake wheel, of springs for biasing said levers to engage said brake shoes to effect operative engagement with said brake wheel and an electromagnet for actuating both of said levers in opposition to said springs to permit said brake shoes to be released by the force of gravity.

2. In a brake, the combination with a brake shoe having a pivotal support and adapted to be actuated to an inoperative position by the force of gravity, of actuating means therefor comprising a biased pivotally mounted lever having a portion for engaging said shoe but independently movable relatively thereto.

3. In a brake, the combination with a brake wheel, and a coacting brake shoe having a pivotal support so arranged that the force of gravity tends to actuate said shoe from said wheel, of a pivotally-mounted lever having an adjustable member engageable with, but movable independently relatively to, said shoe, and means for actuating said lever in both directions about its point of support.

4. In a brake, the combination with a brake wheel, a pair of pivotally supported brake shoes and a pair of pivotally mounted levers, said levers being mounted on opposite sides of said brake wheel, of springs for acting upon one end of each of said levers to effect the engagement of said brake shoes with said brake wheel and an electromagnet for acting upon the opposite ends of said levers to release said brake shoes to permit them to be actuated to their inoperative positions by the force of gravity.

5. The combination with a brake wheel, and a brake shoe adapted to be actuated out of engagement therewith by the force of gravity, of a member movable independently of said shoe and adapted to engage said shoe to actuate it into engagement with said wheel, means for normally effecting engagement of said member with said shoe, and means for releasing said normally effective means.

In testimony whereof, I have hereunto subscribed my name this 28th day of May 1917.

MAX E. GYSEL.